US012711586B2

(12) United States Patent
Razumov et al.

(10) Patent No.: US 12,711,586 B2
(45) Date of Patent: Aug. 18, 2026

(54) STATIC DISTORTION CORRECTION FOR HEAD MOUNTED DISPLAY

(71) Applicant: Varjo Technologies Oy, Helsinki (FI)

(72) Inventors: Andrei Razumov, Helsinki (FI); Antti Hirvonen, Espoo (FI); Marcus Lysén, Stockholm (SE)

(73) Assignee: Varjo Technologies Oy, Helsinki (FI)

( * ) Notice: Subject to any disclaimer, the term of this patent is extended or adjusted under 35 U.S.C. 154(b) by 352 days.

(21) Appl. No.: 18/517,439

(22) Filed: Nov. 22, 2023

(65) Prior Publication Data

US 2025/0166143 A1 May 22, 2025

(51) Int. Cl.
*G06T 5/80* (2024.01)
*G02B 27/01* (2006.01)
*G06T 5/50* (2006.01)

(52) U.S. Cl.
CPC ............ *G06T 5/80* (2024.01); *G02B 27/0172* (2013.01); *G06T 5/50* (2013.01); *G06T 2207/20221* (2013.01)

(58) Field of Classification Search
CPC ... G06T 5/80; G06T 5/50; G06T 2207/20221; G02B 27/0172
See application file for complete search history.

(56) References Cited

U.S. PATENT DOCUMENTS 10,156,723 B2 * 12/2018 Bates ................. G02B 27/0093
10,551,879 B1 * 2/2020 Richards ............... G06F 1/1637
2017/0169602 A1 * 6/2017 Blackmon ............... G06T 15/06
2018/0183986 A1 * 6/2018 Smith .................... H04N 23/76
2019/0377270 A1 * 12/2019 Kanehara ............ G03F 7/70491
2021/0271880 A1 * 9/2021 Park ....................... G06V 20/20
2024/0177637 A1 * 5/2024 Ye ...................... G02B 27/0955

OTHER PUBLICATIONS

Hiroi et al, "Neural Distortion Fields for Spatial Calibration of Wide Field-of-View Near-Eye Displays" [Online], Published Oct. 22, 2025, [Retrieved on Dec. 18, 2025], Retrieved from the Internet: <https://arxiv.org/abs/2210.12389> (Year: 2022).*

* cited by examiner

*Primary Examiner* — King Y Poon
*Assistant Examiner* — David Van Nguyen
(74) *Attorney, Agent, or Firm* — Ziegler IP Law Group, LLC.

(57) ABSTRACT

Disclosed is a method and a Head Mounted Display (HMD) for static distortion correction. The method involves collecting distortion data from an optical arrangement of the HMD, associated with a plurality of gaze directions defined by relative position of the user's pupil or head to a display screen of the HMD. The distortion data includes display pixel coordinates for display pixels and their corresponding image plane coordinates. A distortion map for each gaze direction is generated, including virtual plane coordinates of the corresponding display pixels derived from the distortion data, which are combined to form a single multi-view distortion map, calculated by a weighted average of the virtual plane coordinates across the gaze directions. The multi-view distortion map is applied to display content, ensuring distortion correction across entire field of view of the display screen of the HMD.

11 Claims, 4 Drawing Sheets

STATIC DISTORTION CORRECTION FOR HEAD MOUNTED DISPLAY

TECHNICAL FIELD

The present disclosure relates to a method for static distortion correction for a head mounted display. Moreover, the present disclosure relates to a head mounted display.

BACKGROUND

Head mounted displays (HMDs) are utilized in virtual reality (VR) and augmented reality (AR) technologies, offering immersive experiences for users in gaming, education, training, and other applications. These devices, often compact and wearable, project visual content directly in front of the user's eyes, creating a perception of being in a virtual environment. The HMD devices have progressed significantly over the years, with advancements in display resolution, field of view (FOV), tracking accuracy, and user interface.

Despite significant advancements, HMD devices face some challenges that impact user experience. A primary concern is the phenomenon known as "pupil swim." Pupil swim refers to the warping or bending of images perceived by the user when there is movement of the eyes. This results from the human eye's pupil not being located at the center of the eyeball's rotation. Consequently, any rotation of the eye leads to a shift in position of the pupil, altering the way light is refracted through optics of the HMD and resulting in visual distortion. This distortion is more pronounced in VR/AR environments due to the close proximity of the display to the user's eyes and the optical configurations used in HMDs.

Referring to FIG. 1A, illustrated is an image 100A that has been subjected to distortion correction specifically tailored for a direct or 'straight' gaze direction, corresponding to a gaze vector of (0; 0; 1). This direction implies that the user is looking straight ahead, typically perpendicular to the plane of the display screen. The image 100A appears to be correctly adjusted, with minimal distortion, as indicated by the uniformity and regularity of the QR code's grid pattern. A cross marking 102A denotes the focal point of the gaze, aligned centrally, suggesting that the distortion correction has been optimized for this particular gaze orientation.

Referring to FIG. 1B, illustrated is an image 100B as seen through an optical arrangement of the HMD, with the same distortion correction specifically tailored for gaze direction (0; 0; 1) applied as in FIG. 1A, when the user's gaze is directed away from the center, corresponding to an arbitrary gaze vector (x; y; z). The image 100B provides the scenario when the eye rotates to a new position, causing the pupil to dislocate from its original, central location. A cross marking 102B is shown which is displaced from the center, highlighting the new gaze direction after the eye's movement. As may be seen, the image 100B depicts noticeable distortion; the QR code grid is warped, bowing outward in a convex manner. This distortion, more pronounced along the periphery.

To address the challenges posed by visual distortions in HMDs, some solutions have been implemented in the industry. A widely used approach involves making real-time adjustments to the displayed image based on the user's eye movements. These techniques typically employ eye-tracking systems integrated into the HMD. Eye-tracking sensors monitor the position and movement of the user's pupils, and the displayed image is adjusted to compensate for the detected changes in eye position, thereby reducing the visual distortions. Such dynamic distortion correction techniques relying on eye-tracking systems, though effective, introduce additional complexity and cost to the HMD design. However, the incorporation of the eye-tracking systems increases the weight and power consumption of the HMD.

Therefore, in the light of the foregoing discussion, there exists a need to overcome the aforementioned drawbacks.

SUMMARY

The aim of the present disclosure is to provide a method and a head mounted display for static distortion correction. The aim of the present disclosure is achieved by a method and a head mounted display (HMD) for static distortion correction, as defined in the appended independent claims, while eliminating the need for dynamic adjustments based on eye-tracking, thereby simplifying design and operation of HMDs, and enhancing the user's visual experience. Advantageous features and additional implementations are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
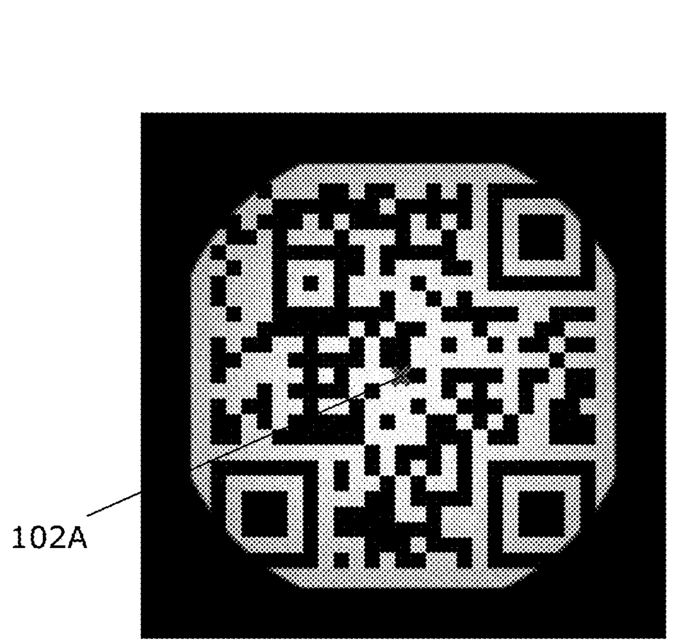
FIG. 1A is an illustration of an image subjected to distortion correction for a direct gaze direction.
Figure 1B:
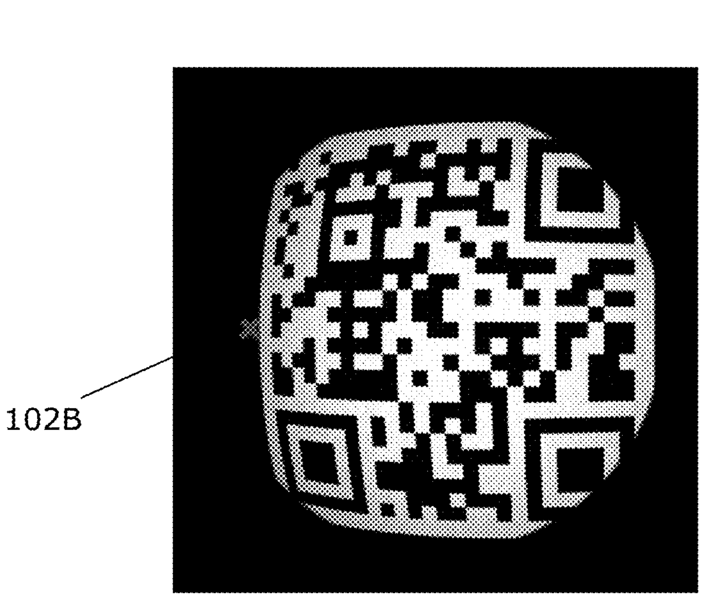
FIG. 1B is an illustration of an image seen through an optical arrangement of a head mounted display when the user's gaze is directed away from the center.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides a method for static distortion correction for a head mounted display (HMD), the method comprising:

collecting distortion data, of an optical arrangement of the HMD, corresponding to a plurality of gaze directions, wherein each of the plurality of gaze directions is a direction of sight defined by a pupil-position or a head-position with respect to a display screen of the HMD, and wherein the distortion data comprises display pixel coordinates for display pixels and corresponding image plane coordinates;

generating a distortion map corresponding to each of the plurality of gaze directions, wherein the distortion map comprises virtual plane coordinates of the corresponding display pixels determined using the distortion data;

combining the distortion map, corresponding to each of the plurality of gaze directions, to compute a single multi-view distortion map, wherein the single multi-view distortion map is defined by calculating a weighted average of each virtual plane coordinates on the distortion map for the plurality of gaze directions; and applying the single multi-view distortion map on a display content to be rendered on the display screen for the static distortion correction for an entire field of view associated with the display screen of the HMD.

In a second aspect, the present disclosure provides a head mounted display (HMD) comprising:

a display screen;

an optical arrangement operatively coupled to the display screen; and a processor operatively coupled to the display screen, wherein the processor is operable to collect distortion data of the optical arrangement corresponding to a plurality of gaze directions, wherein each of the plurality of gaze directions is a direction of sight defined by a pupil-position or a head-position with respect to the display screen, and wherein the distortion data comprises display pixel coordinates for display pixels and corresponding image plane coordinates;

generate a distortion map corresponding to each of the plurality of gaze directions, wherein the distortion map comprises virtual plane coordinates of the corresponding display pixels determined using the distortion data;

combine the distortion map, corresponding to each of the plurality of gaze directions, to compute a single multi-view distortion map, wherein the single multi-view distortion map is defined by calculating a weighted average of each virtual plane coordinate on the distortion map for the plurality of gaze directions; and apply the single multi-view distortion map on a display content to be rendered on the display screen for the static distortion correction for an entire field of view associated with the display screen of the HMD.

The present disclosure provides the aforementioned method and the aforementioned HMD for static distortion correction, due to pupil swim. To eliminate the effects of the pupil swim, the HMD should have no residual distortion for the objects at which the user can look directly. Since the human eye resolution drops with the distance from the gaze direction, the residual distortion is critical at the regions close to gaze direction and less critical in other areas. The method and the HMD of the present disclosure provide computation of a static distortion map that provides high quality distortion correction for the areas at which the user can look directly for any eye position and eliminates the effects of pupil swim without using additional tools (e.g., eye tracking system) and without dynamically changing the distortion correction.

The method involves collecting distortion data for various gaze directions defined by the position of the pupil or head relative to the display screen of the HMD. This data includes the coordinates of display pixels and their corresponding image plane coordinates. The distortion map is then generated for each gaze direction, incorporating the virtual plane coordinates derived from the distortion data. These individual distortion maps are combined to compute a single multi-view distortion map. This map is defined by calculating the weighted average of the virtual plane coordinates across the different gaze directions. The weighting factors are determined based on the proximity of each virtual plane coordinate to a specific gaze direction, with closer coordinates receiving higher weights. Subsequently, the single multi-view distortion map is applied to the display content rendered on the display screen of the HMD, ensuring static distortion correction. The method and the HMD of the present disclosure provides a solution to the problem of pupil swim, greatly enhancing the visual fidelity and user experience in VR and AR applications.

Throughout the present disclosure, the term "head mounted display" refers to an equipment that is configured to present an extended-reality (XR) environment to a user when said HMD device, in operation, is worn by said user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The HMD includes the display screen for rendering images, the optical arrangement for directing these images into the user's eyes, and the processor for controlling the display content and performing necessary computations, including the application of distortion correction algorithms.

As used herein, the "display screen" is a surface onto which the visual content is rendered for viewing by the user. The screen may employ various display technologies such as LCD (Liquid Crystal Display), OLED (Organic Light-Emitting Diode), or others suited for compact and efficient display in the HMD. The display screen is optimized for close viewing distances, ensuring that the images appear clear, sharp, and without pixelation, even when viewed from a very short distance. The characteristics of the display screen, such as resolution, refresh rate, color accuracy, and brightness, are tailored to enhance the overall visual experience in VR/AR applications, ensuring that the content appears as realistic and immersive as possible to the user.

Further, in the HMD, the "optical arrangement" includes an arrangement of lenses and other optical elements designed to project the images from the display screen into the user's eyes. The optical arrangement is operatively coupled to the display screen. The optical arrangement may serve multiple purposes including, magnifying the images from the small display screen to fill the user's field of view, correcting for optical aberrations to maintain image clarity and fidelity, and ensuring that the images are focused properly for comfortable viewing over extended periods. The optical arrangement is configured to provide a wide field of view, accommodate a range of eye movements and positions, and minimize distortions (including pupil swim, using teachings of the present disclosure).

The term "processor" refers to a processing unit that is configured to control an overall operation of the HMD and to implement the processing steps. Examples of implementation of the at least one of processor may include, but are not limited to, a central data processing device, a microprocessor, a microcontroller, a complex instruction set computing (CISC) processor, an application-specific integrated circuit (ASIC) processor, a reduced instruction set (RISC) processor, a very long instruction word (VLIW) processor, a state machine, and other processors or control circuitry. The processor is communicably coupled to the display screen.

The method comprises collecting the distortion data, of the optical arrangement of the HMD, corresponding to the plurality of gaze directions, wherein each of the plurality of gaze directions is the direction of sight defined by the pupil-position or the head-position with respect to the display screen of the HMD, and wherein the distortion data comprises the display pixel coordinates for display pixels and the corresponding image plane coordinates. The collection of the distortion data corresponding to the plurality of gaze directions ensures that the static distortion correction is not limited to a singular view but extends to the entire scope of potential user interactions. The 'gaze directions' refers to a series of vectors (typically, unit vectors), each signifying a distinct directional line of sight for the user when interacting with the HMD. The gaze directions are intrinsically defined by the position of the pupil (termed as 'pupil-position'), or the position of the head (termed as 'head-position') relative to the display screen of the HMD. Herein, the pupil-position is indicative of the specific orientation and location of the user's pupil, denoting the user's focal point on the display screen at any given moment. Similarly, the head-position contributes to the gaze direction, as angular disposition of the user's head, in conjunction with eye movements.

Herein, the distortion data includes the display pixel coordinates for display pixels and the corresponding image plane coordinates. The display pixel coordinates represent the physical locations of pixels on the display screen of the HMD. Each pixel is a point of light emission, and its position on the display screen helps in understanding how the light it emits interacts with the optical arrangement of the HMD. Further, for each display pixel coordinate, there is a corresponding image plane coordinate. This image plane coordinate represents where the display pixel actually appears in the user's field of view. It may be understood that the relationship between the display pixel coordinates and the corresponding image plane coordinates is altered by the optical arrangement, leading to the visual distortions that the user experiences.

In an embodiment, the plurality of gaze directions is associated with arbitrary regions of the display screen or pre-defined regions of interest for the display screen. That is, the plurality of gaze directions that define the collection of distortion data is associated with either the arbitrary regions of the display screen or the pre-defined regions of interest. When the gaze directions correspond to the arbitrary regions, the method may utilize random sampling approach to arbitrarily select regions of the display screen for each gaze direction, to provide a broad and varied dataset, capturing distortion characteristics across a wide spectrum of the display screen. This approach is especially useful for general applications where user behavior is unpredictable or where regions of interest have not yet been determined. In other case, associating the gaze directions with the pre-defined regions of interest allows collection of the distortion data to be more targeted and relevant to the expected use cases of the HMD. These regions of interest are typically determined based on user interaction patterns, such as the central area of the screen where the eyes naturally rest, or areas that are relevant for specific applications, like the corners of the screen for wide-angle viewing in immersive environments. This approach may be more efficient and effective, and ensures that the distortion correction is optimized for the most visually relevant parts of the display screen, enhancing the user experience.

In an embodiment, the distortion data is collected for a pre-defined set of pixels on the display screen or every pixel on the display screen. The selection of the pre-defined set of pixels allows for targeted data collection, focusing on strategic areas of the display screen that are most affected by distortion or are most relevant to the user's visual experience. This subset of pixels can be chosen based on factors such as their location within the user's central field of view, their significance in the context of the displayed content, or their susceptibility to high distortion effects. In an example, if the distortion data is collected for the pre-defined set of pixels, the rest of the distortion data may be interpolated. This approach offers the advantage of efficiency, reducing computational load by focusing on areas most critical to the user experience, which can be particularly beneficial for HMDs with limited processing capabilities. Alternatively, collecting the distortion data for every pixel on the display screen provides a comprehensive map of distortion across the entire visual field. This exhaustive data collection ensures that the distortion correction is uniformly applied to the entire image, thereby enhancing the overall visual output. This approach allows for a comprehensive understanding of distortion effects across the entire visual field, leading to a highly accurate correction. In general, the provided alternative approaches cater to varying levels of precision based on the requirements of the distortion correction process for the HMD.

In the present embodiments, the distorted data is collected by one of:

- using software to simulate propagation of light through the optical arrangement,
- using a camera setup to capture images through the optical arrangement,
- using software to simulate propagation of light through an inverted optical system, wherein the display screen is used as an image plane.

The present method provides several approaches for collecting distortion data for the HMD. One approach utilizes software designed to simulate the propagation of light through the optical arrangement of the HMD, by geometric optics (rays) or by physical optics (wavefront propagation). This simulation provides a model of how light behaves as it traverses the optical arrangement of the HMD, providing details about the resultant visual distortions without need for physical experimentation. Alternatively, the method may employ a camera setup positioned in a manner analogous to the user's eye, aimed at capturing images through the optical arrangement that is operatively associated with the display screen of the HMD. This approach collects real-world distortion data, reflecting the actual performance of the optical arrangement as it interacts with light emitted from the display screen. The captured images serve as a dataset for analyzing and correcting the optical distortions experienced by users. Another alternative approach involves the use of software to simulate the propagation of light through an inverted optical system, where the display screen functions as the image plane. In this simulated environment, light is traced in reverse, from the display screen outward through the optical arrangement. This approach allows for the prediction and pre-correction of distortions by altering the display content based on the inverse mapping of light paths. This approach is particularly useful for establishing how the display screen should be adjusted to compensate for inherent optical distortions in the HMD.

The method further comprises generating the distortion map corresponding to each of the plurality of gaze directions, wherein the distortion map comprises the virtual plane coordinates of the corresponding display pixels determined using the distortion data. This involves the creation of distortion maps that are based on the coordinates of a virtual plane (where the display content is rendered), which are derived from the distortion data collected. The virtual plane coordinates derived from the distortion data define a point on the virtual plane which may be represented by corresponding display pixel in order for the displayed content to appear undistorted to the user. As used herein, the "virtual plane coordinates" may correspond to Normalized Device Coordinates (NDC), which is a standard coordinate system with normalized scaling with Z axis pointing away from the user (observer) located in the origin. Each distortion map is associated with a specific gaze direction, capturing the unique distortion characteristics associated with that line of sight. By utilizing the distortion data, which includes the original positions of the display pixels on the display screen, it is possible to calculate the necessary adjustments needed to be made to the image in the virtual plane coordinates, to compensate the effects of aberrations due to the optical arrangement.

In an embodiment, generating the distortion map comprise one of:

- generating the distortion map for a full field of view corresponding to each of the plurality of gaze directions, and
- generating the distortion map for a reduced field of view corresponding to each or some of the plurality of gaze directions.

That is, the generation of distortion maps for the Head Mounted Display (HMD) can be executed in various ways, each tailored to suit different requirements and applications. It may be understood that, as used herein, the field of view (FOV) may include, for example, cone-shaped FOV of certain width around the gaze direction, an asymmetric FOV of any shape for any gaze direction, and the like. Herein, the first approach involves generating the distortion map for each gaze direction that encompasses the full field of view (FOV) thereof. This approach ensures that all visible areas of the display screen are considered for each single gaze direction and no data is discarded. The resultant distortion maps provide comprehensive map of the optical aberrations affecting the entirety of display screen, and thus facilitate a thorough correction process that enhances the overall visual experience by ensuring accuracy across the entirety of the display screen in the HMD. The second approach focuses on generating distortion maps for either each or some of the plurality of gaze directions, but only for a reduced field of view of the display screen. This approach allows for a more focused analysis and correction of distortions in specific areas of the display. For example, the distortion map for the gaze direction corresponding to a top right corner of the display screen may not have any data for other areas of the display screen, so it may have no effect on the distortion correction in other areas. By concentrating on a reduced FOV, resources and computational efforts can be efficiently used for areas that most significantly impact the user experience. This approach is particularly beneficial in applications where certain regions of the display are of higher importance, such as in task-focused VR/AR environments.

The method further comprises combining the distortion map, corresponding to each of the plurality of gaze directions, to compute the single multi-view distortion map, wherein the single multi-view distortion map is defined by calculating the weighted average of each virtual plane coordinates on the distortion map for the plurality of gaze directions. The process begins by compiling the distortion maps that have been generated for each gaze direction. Each of these maps contains data about how the visual content displayed on the display screen of the HMD should be adjusted to appear correctly from that particular gaze direction. These individual distortion maps are combined using the weighted average calculation of the virtual plane coordinates from each distortion map. This means that for every pixel (or region) on the display screen, the method considers its adjusted positions from all the distortion maps and calculates an average position. It may be appreciated that not all gaze directions may be equally relevant for a user at any given moment, and therefore, gaze directions that are more likely be in the user's line of sight (like, directly in front or towards key elements) are given more weight in the calculation. This weighted averaging process results in the single multi-view distortion map that includes the details of distortions from multiple viewpoints, which is then applied to the display content, allowing for adjustment of the visual output and ensuring that the display content remains consistently undistorted across a wide range of user movements and interactions.

In an embodiment, a weight of a corresponding virtual plane coordinate on the distortion map is based on a distance between the corresponding virtual plane coordinate and a gaze direction of the distortion map, and wherein the weight decreases with increase of the distance. That is, the process of computing the multi-view distortion map is based on the spatial relationship between each virtual plane coordinate and its corresponding gaze direction. In particular, the weight assigned to each virtual plane coordinate is based on its distance from a particular gaze direction represented in the distortion map. This is based on mechanism that the closer a virtual plane coordinate is to a gaze direction, the more significant may be its role in determining the appearance of the final image from that gaze direction. Therefore, coordinates that are closer to the gaze direction are given higher weights, and as the distance between a virtual plane coordinate and the gaze direction increases, the weight assigned to that coordinate correspondingly decreases. This ensures that the distortion correction is most accurate in the areas of the display screen that are directly in the user's line of sight (i.e., where the user is focusing).

In an embodiment, a weight of the corresponding virtual plane coordinate on the distortion map is based on a type of the gaze direction encompassing the corresponding virtual plane coordinate, and wherein the type of the gaze direction comprises a critical gaze direction having a higher weight based a higher probability of being viewed, a moderate gaze direction having a moderate weight based a moderate probability of being viewed and a non-critical gaze direction. This approach involves assigning weights to the virtual plane coordinates on the distortion map, not just based on spatial proximity to gaze directions, but also considering the significance or type of each gaze direction. The gaze directions are classified into three distinct types: critical, moderate, and non-critical. This classification is premised on the probability or frequency with which a user is expected to look in each direction while using the HMD. The critical gaze directions include gaze directions that have a higher likelihood of being the focus of the user's attention. This may include, for instance, areas directly in front of the user or those that typically contain important visual content fall into this category. The virtual plane coordinates associated with the critical gaze directions are assigned higher weights, ensuring that the distortion correction is tuned in these regions, thereby maintaining high visual accuracy for the user of the HMD. The moderate gaze directions include gaze directions that are viewed with moderate frequency. This may include, for instance, areas that users look at occasionally or secondary regions of interest on the display screen. The virtual plane coordinates associated with the moderate gaze directions are given moderate weights, balancing the need for distortion correction with the lesser frequency of viewing these areas. The non-critical gaze directions include gaze directions that are least likely to be the focus of the user's attention, such as peripheral angles of the display screen. The virtual plane coordinates associated with the non-critical gaze directions are given lower weights, as distortions in these areas are less likely to impact the user's overall experience. By categorizing gaze directions and adjusting the weights of the virtual plane coordinates accordingly, the present method allows for the distortion correction based on the user's viewing behavior.

The method further comprises applying the single multi-view distortion map on the display content to be rendered on the display screen for the static distortion correction for the entire field of view associated with the display screen of the HMD. That is, once the multi-view distortion map is computed, it is then superimposed onto the display content for display screen of the HMD. This acts as an inverse distortion map to the display content, which is pre-adjusted or pre-distorted according to the multi-view distortion map, such that the images in the display content, which may otherwise appear warped due to the optical arrangement of the HMD, are rendered correctly. This ensures that regardless of where the user's gaze is directed within the field of view, the visual content will appear undistorted, effectively mitigating the issue of pupil swim.

The present disclosure also relates to the second aspect as described above. Various embodiments and variants disclosed above, with respect to the aforementioned first aspect apply mutatis mutandis to the second aspect.

In particular, in the HMD of the present disclosure, the display screen serves as the primary interface for visual output, rendering the display content that is then subjected to the optical arrangement, which manipulate the images from the display screen for the user's perception of the virtual environment, and in the process may introduce some distortions therein (dependent on the pupil position), which the present disclosure aims to correct. Herein, the processor of the HMD collects distortion data that corresponds to the plurality of gaze directions, each defined by the user's pupil-position or head-position relative to the display screen. The distortion data includes display pixel coordinates for display pixels and corresponding image plane coordinates, to map out how the image rendered on the display screen is perceived by the user through the optical arrangement. Upon gathering this data, the processor then generates a distortion map for each gaze direction, and combines these individual distortion maps to compute the multi-view distortion map. This is achieved by calculating the weighted average of each virtual plane coordinate across the distortion maps for all gaze directions. This multi-view distortion map is then applied to the display content for the display screen. By doing so, the processor implements static distortion correction across, generally, the entire field of view of the display screen of the HMD.

In an embodiment, the processor is operable to assign a weight to a corresponding virtual plane coordinate on the distortion map based on a distance between the corresponding virtual plane coordinate and a gaze direction of the distortion map, and wherein the weight decreases with increase of the distance.

In an embodiment, the processor is operable to assign a weight to a corresponding virtual plane coordinate on the distortion map based on a type of the gaze direction encompassing the corresponding virtual plane coordinate, and wherein the type of the gaze direction comprises a critical gaze direction having a higher weight based a higher probability of being viewed, a moderate gaze direction having a moderate weight based a moderate probability of being viewed and a non-critical gaze direction having a lower weight based a low probability of being viewed.

In an embodiment, the processor is operable to collect the distortion data for a pre-defined set of pixels on the display screen or every pixel on the display screen.

In an embodiment, the plurality of gaze directions is associated with arbitrary regions of the display screen or pre-defined regions of interest for the display screen.

In an embodiment, the processor is operable to generate the distortion map by one of:

- generating the distortion map for a full field of view corresponding to each of the plurality of gaze directions, and
- generating the distortion map for a reduced field of view corresponding to each or some of the plurality of gaze directions.

The method and the HMD of the present disclosure provide a solution to the problem of pupil swim. By using a weighted approach to combine distortion maps from multiple gaze directions, the proposed solution ensures a high degree of accuracy in distortion correction, not just for the central area of the field of view but across the entire visual field. Further, the method and the HMD of the present disclosure eliminate the need for dynamic adjustments based on real-time eye-tracking, thereby simplifying the design of the HMD, and particularly making it less costly. Also, dynamic systems that depend on eye-tracking can be prone to inaccuracies due to rapid eye movements or calibration issues. The proposed solution, using static distortion correction, provides consistent visual quality without the need for constant recalibration or adjustment to the user's eye movements.

DETAILED DESCRIPTION OF THE DRAWINGS

Figure 2:
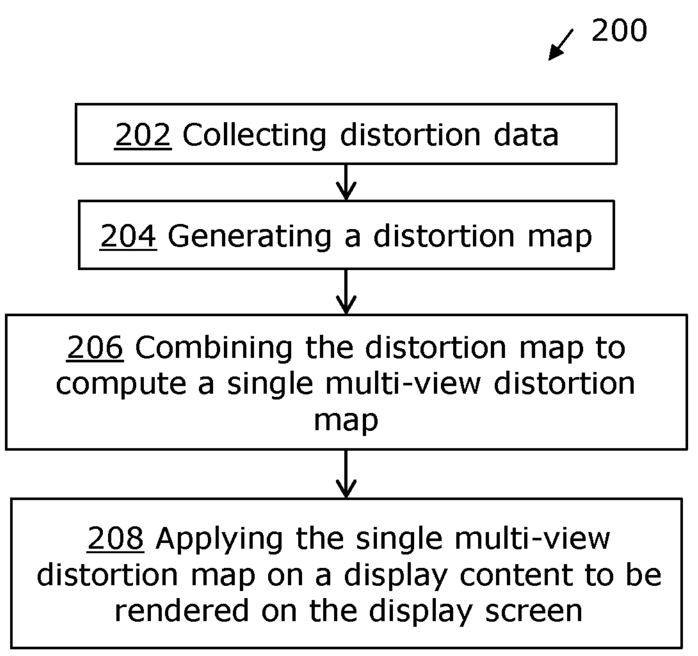
FIG. 2 is a flowchart listing steps involved in a method for static distortion correction for a head mounted display (HMD), in accordance with embodiments of the present disclosure.

Referring to FIG. 2, illustrated is a flowchart listing steps involved in a method 200 for static distortion correction for a head mounted display (HMD), in accordance with embodiments of the present disclosure. At step 202, the method 200 includes collecting distortion data, of an optical arrangement of the HMD, corresponding to a plurality of gaze directions, wherein each of the plurality of gaze directions a direction of sight defined by a pupil-position or a head-position with respect to a display screen of the HMD. Herein, the distortion data comprises display pixel coordinates for display pixels and corresponding image plane coordinates. At step 204, the method 200 includes generating a distortion map corresponding to each of the plurality of gaze directions. Herein, the distortion map comprises virtual plane coordinates of the corresponding display pixels determined using the distortion data. At step 206, the method 200 includes combining the distortion map, corresponding to each of the plurality of gaze directions, to compute a single multi-view distortion map. Herein, the single multi-view distortion map is defined by calculating a weighted average of each virtual plane coordinates on the distortion map for the plurality of gaze directions. At step 208, the method 200 includes applying the single multi-view distortion map on a display content to be rendered on the display screen for the static distortion correction for an entire field of view associated with the display screen of the HMD.

The aforementioned steps are only illustrative, and other alternatives can also be provided where one or more steps are added, one or more steps are removed, or one or more steps are provided in a different sequence without departing from the scope of the claims herein.

Figure 3:
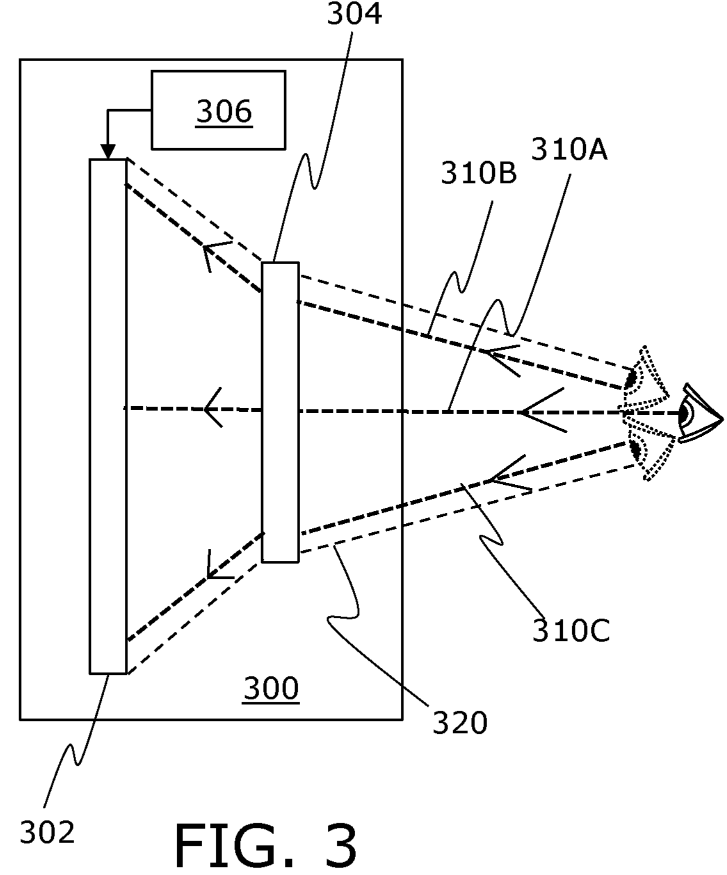
FIG. 3 is a schematic block diagram illustration of the HMD, in accordance with embodiments of the present disclosure.

Referring to FIG. 3, illustrated is a schematic block diagram of the HMD 300, in accordance with embodiments of the present disclosure. The HMD 300 includes a display screen 302, to render the display content for the user. The HMD 300 also includes an optical arrangement 304 operatively coupled to the display screen 302. The optical arrangement 304 is configured to direct the light from the display screen 302 towards the user's eyes, thus creating the visual experience. The HMD 300 further includes a processor 306 operatively coupled to the display screen 302. As illustrated in FIG. 3, the processor 306 is configured to collect distortion data of the optical arrangement 304 corresponding to a plurality of gaze directions 310A, 310B, 310C, covering a field of view 320 for the user. Herein, each of the plurality of gaze directions 310A-C is a direction of sight defined by a pupil-position or a head-position with respect to the display screen 302.

Figure 4:
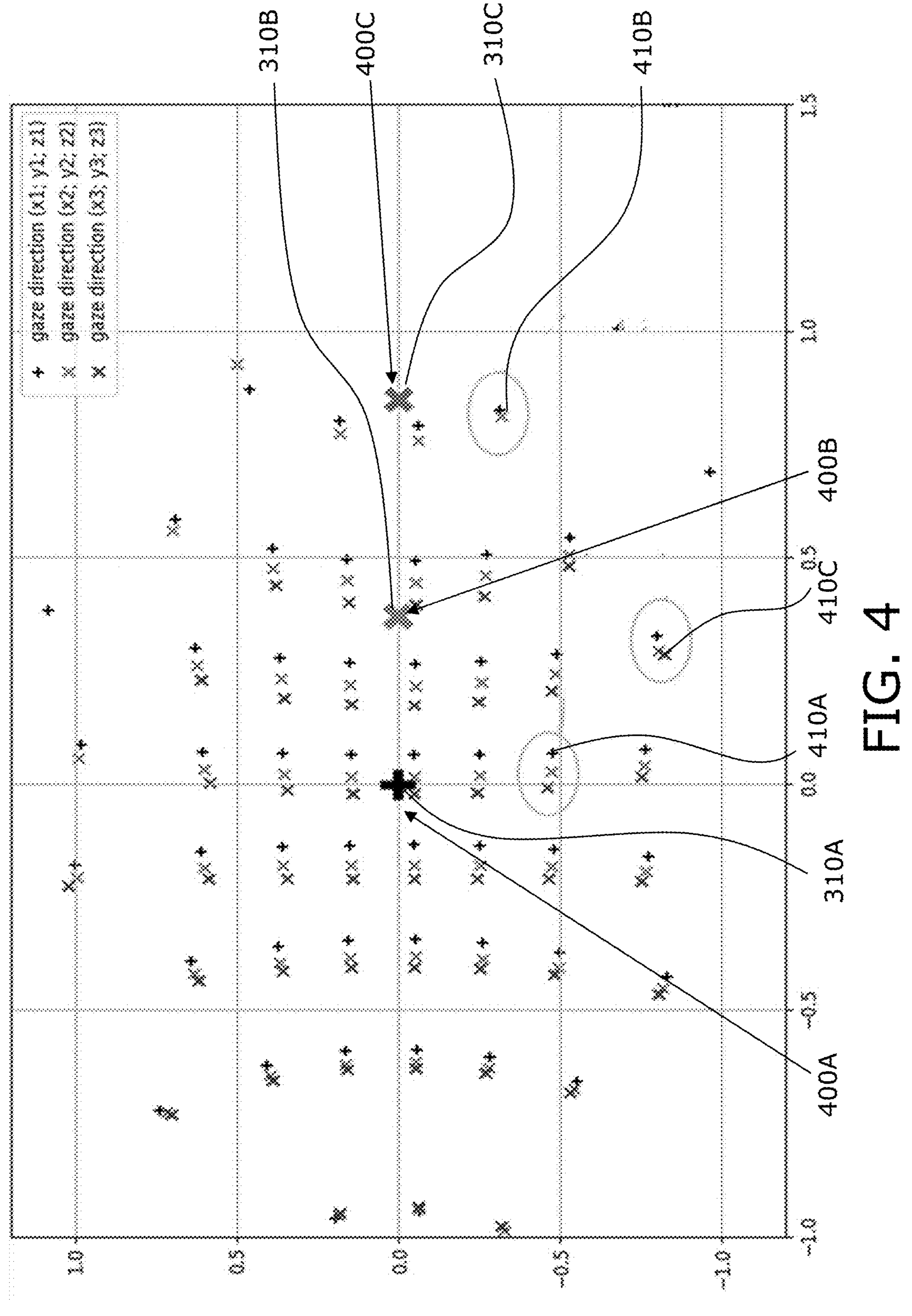
FIG. 4 is a graphical illustration of multiple distortion maps for different gaze directions combined together, in accordance with embodiments of the present disclosure.

Referring to FIG. 4, illustrated is a graphical illustration of multiple distortion maps 400A, 400B and 400C (generally represented) for different gaze directions 310A-C combined together, in accordance with embodiments of the present disclosure. Herein, the processor 306 is configured to generate the distortion maps 400A-C corresponding to each of the plurality of gaze directions 310A-C. The distortion maps 400A-C comprise virtual plane coordinates (410A, 410B, 410C) determined using the distortion data. The multiple distortion maps 400A-C graphically represent the distortion correction strategy employed by the processor 306 of the HMD 300 for each of the plurality of gaze directions 310A-C. The processor 306 is configured to combine the distortion maps 400A-C, corresponding to each of the plurality of gaze directions 310A-C, to compute a single multi-view distortion map (not shown). The multi-view distortion map is the result of aggregating distortion data across multiple gaze directions 310A-C, indicative of various user sightlines relative to the display screen 302. The markers in the distortion maps 400A-C represent individual data points for virtual plane coordinates 410A-C, while the lines connecting these points delineate the transition between different gaze directions 310A-C and the associated distortion correction needed at each point.

Figure 5:
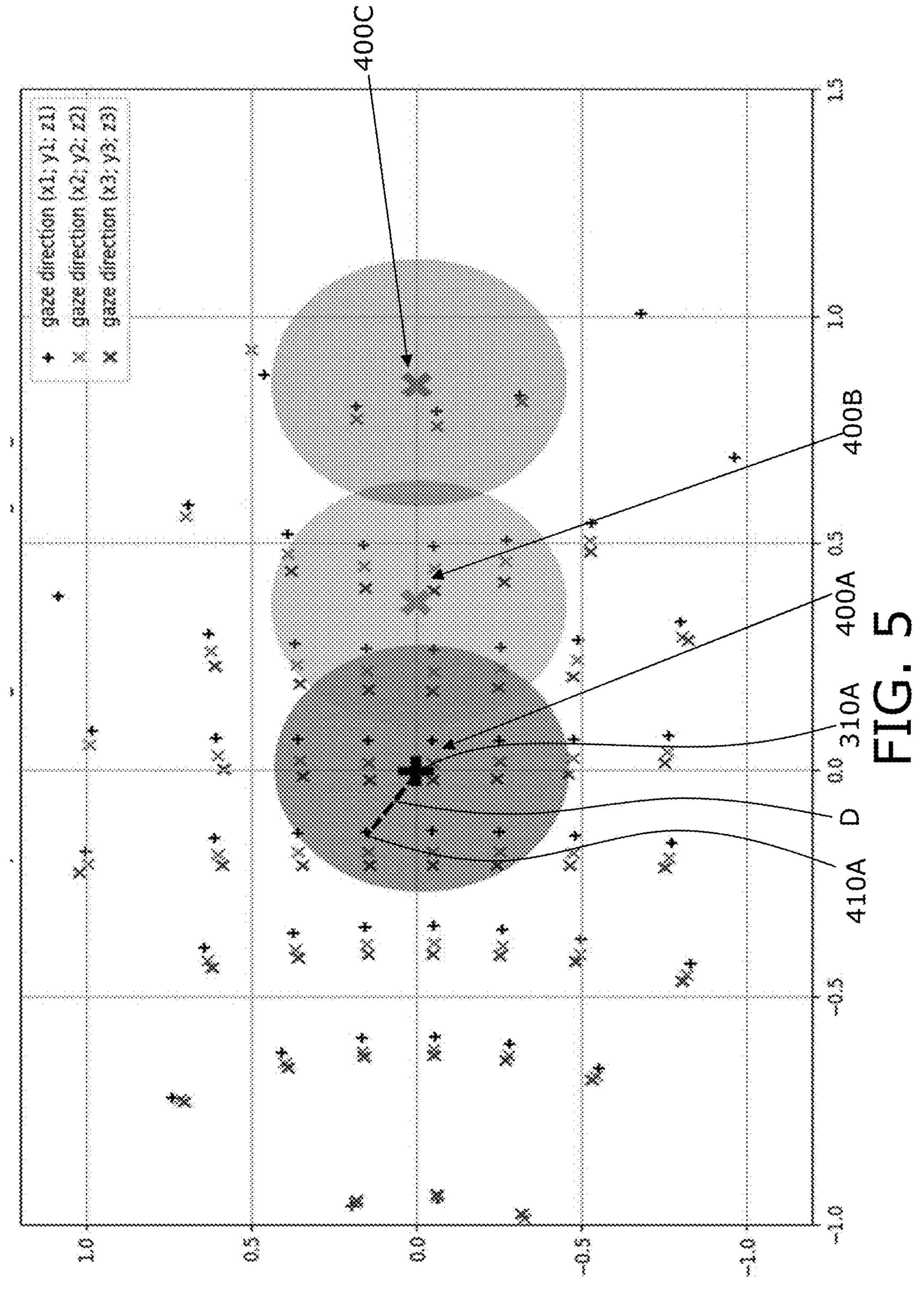
FIG. 5 is a graphical illustration of the multiple distortion maps of FIG. 4 with corresponding assigned weights to virtual plane coordinates therein, in accordance with embodiments of the present disclosure.

Referring to FIG. 5, illustrated is a graphical illustration of the multiple distortion maps 400A-C (of FIG. 4) with corresponding assigned weights to virtual plane coordinates 410A-C therein, in accordance with embodiments of the present disclosure. The processor 306 assigns a weight to each virtual plane coordinate, for example virtual plane coordinate 410A, on the distortion map 400A based on a distance 'D' from the corresponding gaze direction 310A. Notably, FIG. 5 visually differentiates areas of higher weights by encircling them with differently highlighted circles, with each circle corresponding to a separate distortion map and its associated gaze direction, such as the gaze direction 310A. These circles represent the higher weight assigned to the virtual plane coordinates 410A that are in closer proximity to the gaze direction 310A. This variation in weight ensures that distortion corrections are prioritized in the areas of the display screen 302 where the user is directly looking, and reduced with increasing distance from the gaze direction 310A.

For purposes of the present disclosure, the multi-view distortion map, as mentioned, is defined by calculating a weighted average of each virtual plane coordinate 110A-C on the distortion maps 400A-C for the plurality of gaze directions 310A-C. Herein, the processor 306 is configured to apply the multi-view distortion map on the display content to be rendered on the display screen 302 for the static distortion correction for the entire field of view 320 associated with the display screen 302 of the HMD 300.

The invention claimed is:

1. A method for static distortion correction for a head mounted display (HMD), the method comprising:

collecting distortion data, of an optical arrangement of the HMD, corresponding to a plurality of gaze directions, wherein each of the plurality of gaze directions is a direction of sight defined by a pupil-position or a head-position with respect to a display screen of the HMD, and wherein the distortion data comprises display pixel coordinates for display pixels and corresponding image plane coordinates;

generating a distortion map corresponding to each of the plurality of gaze directions, wherein the distortion map comprises virtual plane coordinates of the corresponding display pixels determined using the distortion data;

combining the distortion map, corresponding to each of the plurality of gaze directions, to compute a single multi-view distortion map, wherein the single multi-view distortion map is defined by calculating a weighted average of each virtual plane coordinates on the distortion map for the plurality of gaze directions; and applying the single multi-view distortion map on a display content to be rendered on the display screen for the static distortion correction for an entire field of view associated with the display screen of the HMD, wherein a weight of a corresponding virtual plane coordinate on the distortion map is based on a distance (D) between the corresponding virtual plane coordinate and a gaze direction of the distortion map, and wherein the weight decreases with increase of the distance.

2. A method according to claim 1, wherein a weight of the corresponding virtual plane coordinate on the distortion map is based on a type of the gaze direction encompassing the corresponding virtual plane coordinate, and wherein the type of the gaze direction comprises a critical gaze direction having a higher weight based a higher probability of being viewed, a moderate gaze direction having a moderate weight based a moderate probability of being viewed and a non-critical gaze direction having a lower weight based a low probability of being viewed.

3. A method according to claim 1, wherein the distorted data is collected by one of:

using software to simulate propagation of light through the optical arrangement, using a camera setup to capture images through the optical arrangement, or using software to simulate propagation of light through an inverted optical system, wherein the display screen is used as an image plane.

4. A method according to claim 1, wherein the distortion data is collected for a pre-defined set of pixels on the display screen or every pixel on the display screen.

5. A method according to claim 1, wherein the plurality of gaze directions is associated with arbitrary regions of the display screen or pre-defined regions of interest for the display screen.

6. A method according claim 1, wherein generating the distortion map comprise one of:

generating the distortion map for a full field of view corresponding to each of the plurality of gaze directions, for the entire field of view of the display screen, or generating the distortion map for a reduced field of view corresponding to each or some of the plurality of gaze directions.

7. A head mounted display (HMD) comprising:

a display screen;

an optical arrangement operatively coupled to the display screen; and a processor operatively coupled to the display screen, wherein the processor is operable to collect distortion data of the optical arrangement corresponding to a plurality of gaze directions, wherein each of the plurality of gaze directions is a direction of sight defined by a pupil-position or a head-position with respect to the display screen, and wherein the distortion data comprises display pixel coordinates for display pixels and corresponding image plane coordinates;

generate a distortion map corresponding to each of the plurality of gaze directions, wherein the distortion map comprises virtual plane coordinates of the corresponding display pixels determined using the distortion data;

combine the distortion map, corresponding to each of the plurality of gaze directions, to compute a single multi-view distortion map, wherein the single multi-view distortion map is defined by calculating a weighted average of each virtual plane coordinate on the distortion map for the plurality of gaze directions; and apply the single multi-view distortion map on a display content to be rendered on the display screen for the static distortion correction for an entire field of view associated with the display screen of the HMD, wherein the processor is operable to assign a weight to a corresponding virtual plane coordinate on the distortion map based on a distance (D) between the corresponding virtual plane coordinate and a gaze direction of the distortion map, and wherein the weight decreases with increase of the distance.

8. A HMD according to claim 7, wherein the processor is operable to assign a weight to a corresponding virtual plane coordinate on the distortion map based on a type of the gaze direction encompassing the corresponding virtual plane coordinate, and wherein the type of the gaze direction comprises a critical gaze direction having a higher weight based a higher probability of being viewed, a moderate gaze direction having a moderate weight based a moderate probability of being viewed and a non-critical gaze direction having a lower weight based a low probability of being viewed.

9. A HMD according to claim 7, wherein the processor is operable to collect the distortion data for a pre-defined set of pixels on the display screen or every pixel on the display screen.

10. A HMD according to claim 7, wherein the plurality of gaze directions is associated with arbitrary regions of the display screen or pre-defined regions of interest for the display screen.

11. A HMD according to claim 7, wherein the processor is operable to generate the distortion map by one of:

generating the distortion map for a full field of view corresponding to each of the plurality of gaze directions, or generating the distortion map for a reduced field of view corresponding to each or some of the plurality of gaze directions.

* * * * *